United States Patent
Blaney et al.

(10) Patent No.: US 10,927,710 B2
(45) Date of Patent: Feb. 23, 2021

(54) BLADE OUTER AIR SEAL LAMINATE T-JOINT

(71) Applicant: United Technologies Corporation, Farmington, CT (US)

(72) Inventors: Ken F. Blaney, Middleton, NH (US); Thomas E. Clark, Sanford, ME (US); Daniel J. Whitney, Topsham, ME (US)

(73) Assignee: Raytheon Technologies Corporation, Waltham, MA (US)

( * ) Notice: Subject to any disclaimer, the term of this patent is extended or adjusted under 35 U.S.C. 154(b) by 216 days.

(21) Appl. No.: 16/142,515

(22) Filed: Sep. 26, 2018

(65) Prior Publication Data

US 2020/0095893 A1 Mar. 26, 2020

(51) Int. Cl.
*F01D 25/24* (2006.01)
*F01D 11/08* (2006.01)
*F01D 25/00* (2006.01)

(52) U.S. Cl.
CPC ............ *F01D 25/246* (2013.01); *F01D 11/08* (2013.01); *F01D 25/005* (2013.01); *F05D 2220/323* (2013.01); *F05D 2230/50* (2013.01); *F05D 2240/11* (2013.01); *F05D 2250/75* (2013.01); *F05D 2300/2261* (2013.01);
(Continued)

(58) Field of Classification Search
CPC ...... F01D 25/246; F01D 11/08; F01D 25/005; F05D 2240/11; F05D 2250/75; F05D 2300/6034; F05D 2300/614; F05D 2300/6012; F05D 2300/6033; F05D 2220/323; F05D 2300/2261
See application file for complete search history.

(56) References Cited

U.S. PATENT DOCUMENTS 4,529,355 A * 7/1985 Wilkinson ................ F01D 9/04
415/173.1
4,909,655 A 3/1990 Anderson
(Continued)

FOREIGN PATENT DOCUMENTS

EP 2540479 1/2013
EP 2666622 11/2013
(Continued)

OTHER PUBLICATIONS

The Extended European Search Report for EP Application No. 19199885.5, dated Dec. 12, 2019.

*Primary Examiner* — Christopher Verdier
(74) *Attorney, Agent, or Firm* — Carlson, Gaskey & Olds, P.C.

(57) ABSTRACT

A gas turbine engine includes a compressor section and a turbine section. The turbine section includes at least one rotor and at least one blade extending radially outwardly from the rotor to a radially outer tip. A blade outer air seal assembly is positioned radially outwardly of the radially outer tip of the blade. The blade outer air seal has forward and aft hooks. The forward and aft hooks support the blade outer air seal. The blade outer air seal is formed with a central web. The forward and aft hooks extending from the central web at a T-joint. There is a pair of mating inner laminate at the T-joint each having an axially extending portion and a vertically extending portion. The pair of mating inner laminates have an interwoven connection. A method is also disclosed.

12 Claims, 12 Drawing Sheets

(52) U.S. Cl.
CPC .............. *F05D 2300/6012* (2013.01); *F05D 2300/6033* (2013.01); *F05D 2300/6034* (2013.01); *F05D 2300/614* (2013.01)

(56) References Cited

U.S. PATENT DOCUMENTS

| | | | |
|---|---|---|---|
| 5,026,595 | A | 6/1991 | Crawford, Jr. et al. |
| 5,789,061 | A | 8/1998 | Campbell et al. |
| 7,871,486 | B2 | 1/2011 | Xie et al. |
| 8,940,119 | B2 | 1/2015 | Hanawa et al. |
| 9,103,214 | B2 | 8/2015 | McCaffrey |
| 9,120,276 | B2 | 9/2015 | Wittenberg |
| 9,463,880 | B2 | 10/2016 | Vetter et al. |
| 9,962,901 | B2 | 5/2018 | Goering |
| 9,981,444 | B2 | 5/2018 | Deobald et al. |
| 10,060,056 | B1 | 8/2018 | Head et al. |
| 2002/0192450 | A1 | 12/2002 | Schmidt et al. |
| 2011/0311368 | A1 | 12/2011 | Coupe et al. |
| 2013/0004715 | A1 | 1/2013 | Jarmon et al. |
| 2013/0136582 | A1* | 5/2013 | Mizokami ............... F01D 9/04 415/173.1 |
| 2013/0316131 | A1* | 11/2013 | Oefner ............... B29C 69/001 428/121 |
| 2014/0271145 | A1 | 9/2014 | Thomas et al. |
| 2016/0009045 | A1 | 1/2016 | Thomas |
| 2018/0230064 | A1 | 8/2018 | Lamusga et al. |

FOREIGN PATENT DOCUMENTS

| | | |
|---|---|---|
| EP | 3115199 | 1/2017 |
| EP | 3225725 | 10/2017 |
| EP | 3255252 | 12/2017 |
| WO | 2015/023576 | 2/2015 |

\* cited by examiner

BLADE OUTER AIR SEAL LAMINATE T-JOINT

BACKGROUND

This application relates to a blade outer air seal having unique structure.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

Blade outer air seals have been proposed made of ceramic matrix composite fiber layers.

SUMMARY

In a featured embodiment, a gas turbine engine includes a compressor section and a turbine section. The turbine section includes at least one rotor and at least one blade extending radially outwardly from the rotor to a radially outer tip. A blade outer air seal assembly is positioned radially outwardly of the radially outer tip of the blade. The blade outer air seal has forward and aft hooks. The forward and aft hooks support the blade outer air seal. The blade outer air seal is formed with a central web. The forward and aft hooks extending from the central web at a T-joint. There is a pair of mating inner laminates at the T-joint each having an axially extending portion and a vertically extending portion. The pair of mating inner laminates have an interwoven connection.

In another embodiment according to the previous embodiment, the pair of mating inner laminates are formed of a fibrous woven structure.

In another embodiment according to any of the previous embodiments, the fibrous woven structure includes silicon carbide fibers, and a silicon carbide matrix received about the fibers and within the woven structure.

In another embodiment according to any of the previous embodiments, there are spaces at the T-joint, and the spaces contain fibers embedded in the silicon carbide matrix.

In another embodiment according to any of the previous embodiments, ropes are positioned within the spaces, and contact at least one of the pair of mating laminates. Outer laminates are positioned outwardly of the ropes such that the ropes transfer load.

In another embodiment according to any of the previous embodiments, the spaces are at both of two axial sides of the T-joint and the spaces are radially inward of the axially extending portions of the pair of mating inner laminates.

In another embodiment according to any of the previous embodiments, the ropes are in the spaces at each axial side of each T-shaped joint.

In another embodiment according to any of the previous embodiments, the spaces are at both of two axial sides of the T-joint and the spaces are radially inward of the axially extending portions of the pair of mating inner laminates.

In another embodiment according to any of the previous embodiments, the interwoven connection includes fingers on one of the pair of mating laminate fitting within gaps in the other of the pair of mating laminate.

In another featured embodiment, a method of forming a component includes the steps of providing a pair of mating inner laminates each having an axially extending portion and a vertically extending portion and interweaving the mating inner laminates adjacent a location where the axially extending portions and the vertically extending portions merge. Outer laminate members are positioned on each of the pair of mating inner laminate and on each of two axial sides of the vertical extending portions of the pair of mating laminate.

In another embodiment according to the previous embodiment, spaces are formed on each axial side of the vertically extending portions of the pair of mating laminate members.

In another embodiment according to any of the previous embodiments, loose fibers are placed within the spaces, and a matrix is injected into the loose fibers.

In another embodiment according to any of the previous embodiments, a densification material is injected into the pair of mating inner laminates.

In another embodiment according to any of the previous embodiments, ropes are positioned within the spaces, and contact at least one of the pair of mating inner laminates. Outer laminates are positioned outwardly of the ropes such that the ropes transfer load.

In another embodiment according to any of the previous embodiments, a densification material is injected into the pair of mating inner laminates.

In another embodiment according to any of the previous embodiments, the interwoven connection includes fingers on one of the pair of mating inner laminates within gaps in the other of the pair of mating inner laminates.

In another embodiment according to any of the previous embodiments, the pair of mating inner laminates are formed with slots to facilitate movement of the fingers.

In another embodiment according to any of the previous embodiments, the pair of mating inner laminates are formed of a fibrous woven structure.

In another embodiment according to any of the previous embodiments, the fibrous woven structure includes silicon carbide fibers, and a silicon carbide matrix received about the fibers and within the woven structure.

In another featured embodiment, a gas turbine engine includes a compressor section and a turbine section. The turbine section includes at least one rotor and at least one blade extending radially outwardly from the rotor to a radially outer tip. A component is formed of matrix composites and formed with a central web. At least one portion extends from the central web at a T-joint. There is a pair of mating inner laminates at the T-joint each having an axially extending portion and a vertically extending portion. The pair of mating inner laminates have an interwoven connection.

These and other features may be best understood from the following drawings and specification.

DETAILED DESCRIPTION

Figure 1:
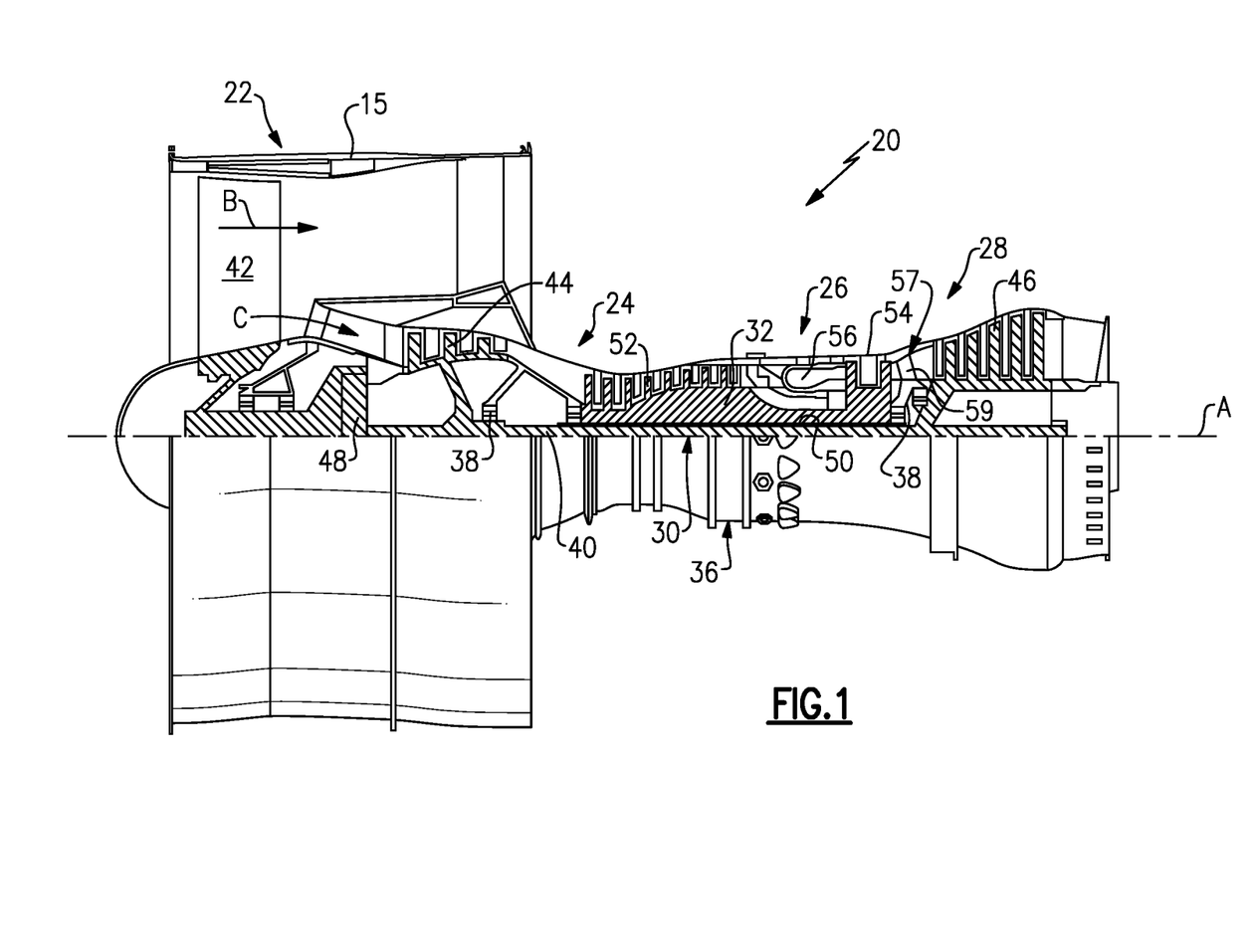
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figures 2, 2A:
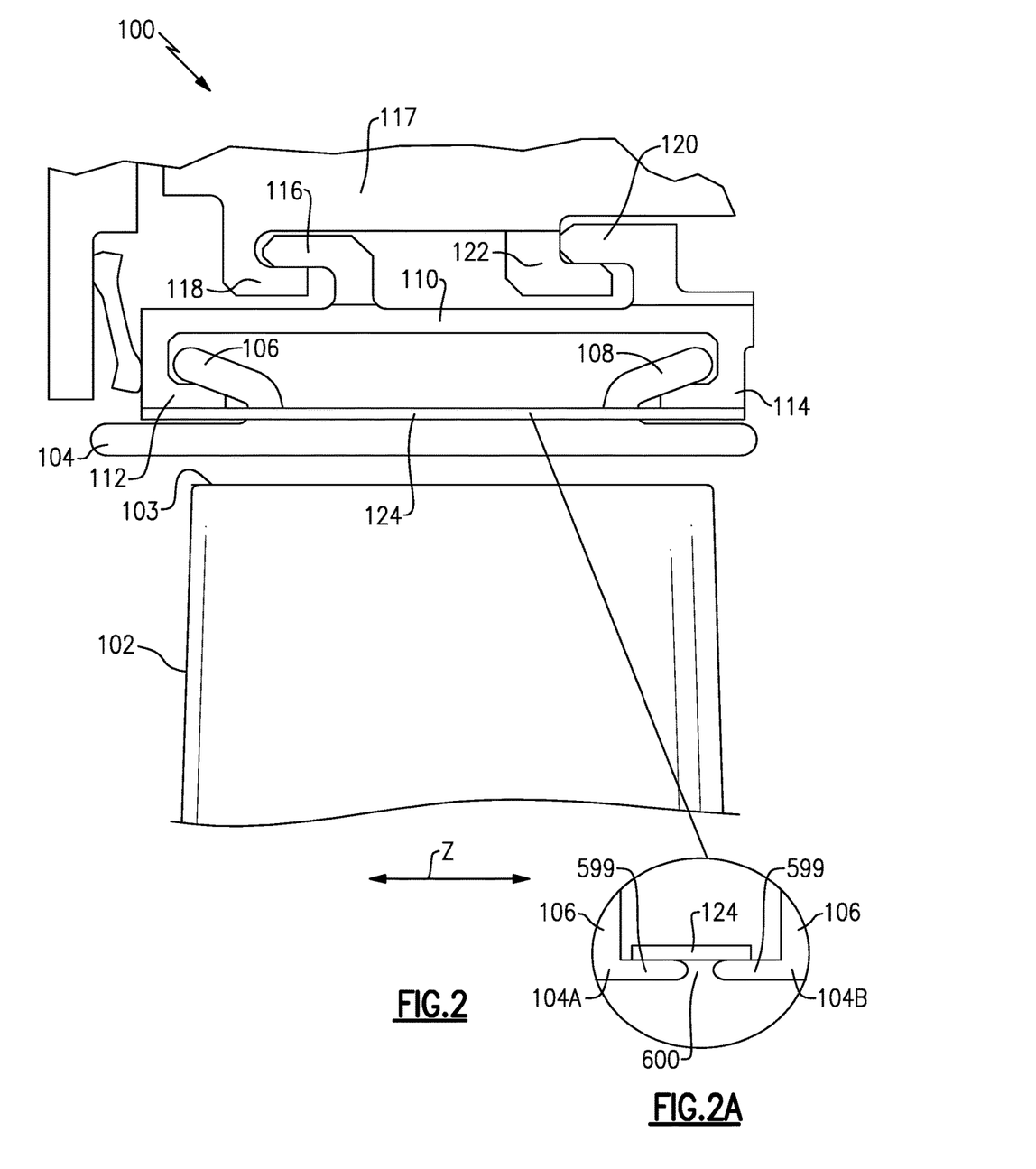
FIG. 2 shows a turbine section that may be part of the FIG. 1 engine.
FIG. 2A shows a detail from FIG. 2.

FIG. 2 shows a turbine section 100, which may be incorporated into a gas turbine engine such as the one shown in FIG. 1. However, it should be understood that the turbine section 100 could be utilized in other gas turbine engines, and even gas turbine engines not having a fan section at all.

A turbine blade 102 has a radially outer tip 103 that is spaced from a blade outer air seal ("BOAS") 104. The BOAS may be formed of a ceramic matrix composite ("CMC") or a monolithic ceramic material. A forward hook 106 and an aft hook 108 are formed on the BOAS 104. A support block 110 includes a rearwardly facing forward hook 112 supporting forward hook 106 and a forwardly facing aft hook 114 supporting aft hook 108.

As shown, the attachment block 110 is supported on a static support or engine case 117. Case 117 has a rearwardly facing forward hook 118 supporting forwardly facing forward hook 116 of the attachment block 110. The case 117 has a rearwardly facing aft hook 122 supporting a forwardly facing aft hook 120 on the attachment block. Case 117 may extend for a full 360° about a rotational axis Z of blade 102.

It should be understood that the arrangement of the hooks 118 and 120 and 116 and 118 could be reversed such that hooks 118 and 122 face forwardly and hooks 116 and 120 face rearwardly. However, in one aspect of this disclosure, the hooks 116 and 120 face in a common axial direction and the hooks 118 and 122 face in an opposed axial direction.

A wedge seal 124 can also be seen. A circled detail is shown in FIG. 2A, wherein the wedge seal 124 can be seen to span a circumferential gap 600 to seal between circumferentially adjacent BOAS 104A and 104B. As shown the BOAS have a surface 599 circumferentially outward of hooks 106 (hooks 108 would look the same) that support the wedge seal 124.

Figure 3A:
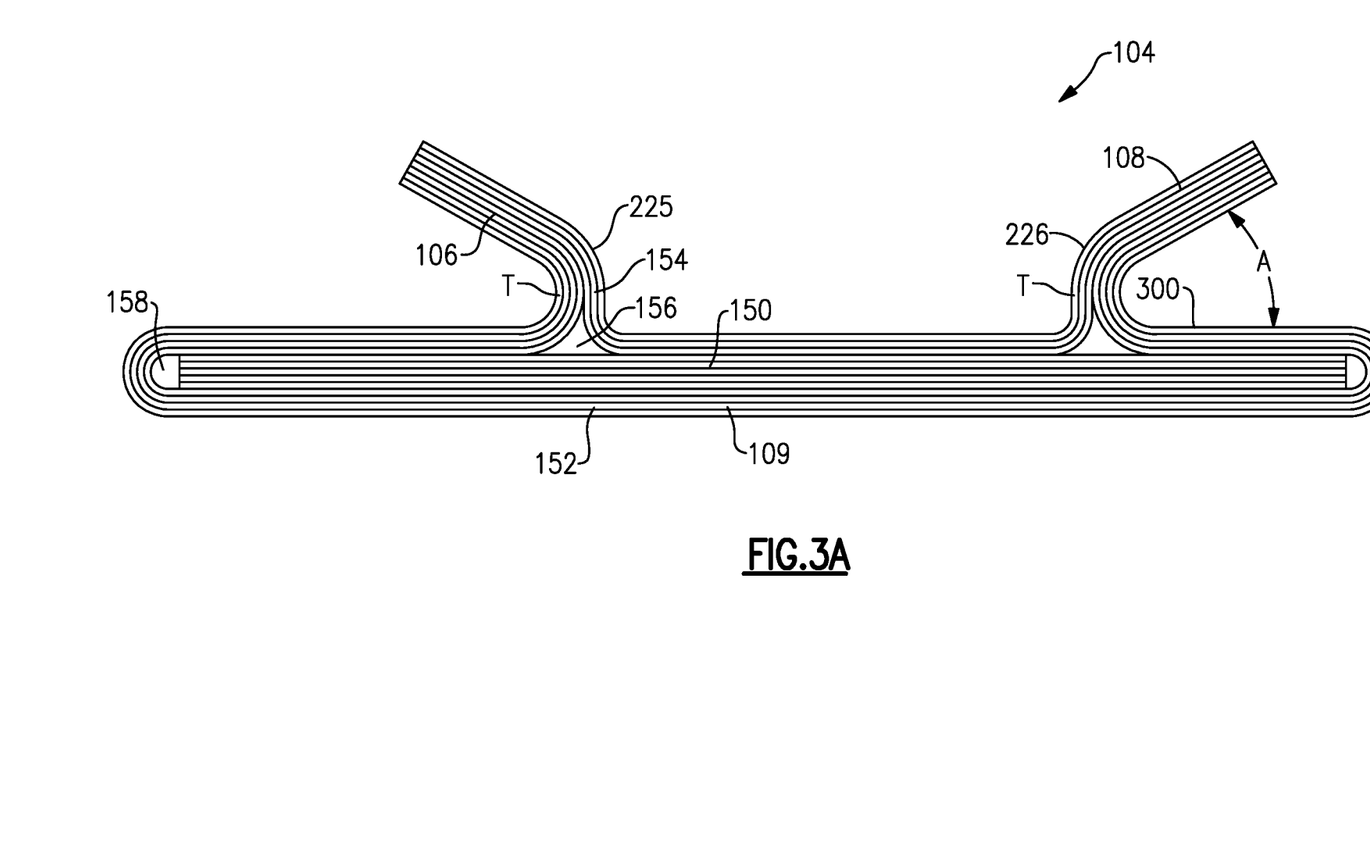
FIG. 3A is a cross-sectional view through a blade outer air seal.

FIG. 3A shows the BOAS 104 having hooks 106 and 108 and a central web 109.

The BOAS 104 is formed of a ceramic matrix composite ("CMC") material, and formed of a plurality of CMC laminates. The laminates may be silicon carbide fibers, formed into a woven fabric in each layer. The fibers may be coated by a boron nitride.

Generally in the prior art there have been only a few laminates in a central web 109. In this embodiment BOAS 104 is shown to have a central reinforcement laminate 150 including a plurality of layers. An overwrap 152 also includes a plurality of layers or laminates, and spans a central web 109 which is defined axially between hooks 106 and 108, and axially outwardly of both hooks. The overwrap layer 152 also extends back to form a radially inner portion of the hooks 106 and 108. A hook backing portion 154 is secured to the overwrap portion 152 to complete the hooks 106 and 108. Spaces 156 and 158 are filled with loose fibers, as will be explained in more detail below.

Figure 3B:
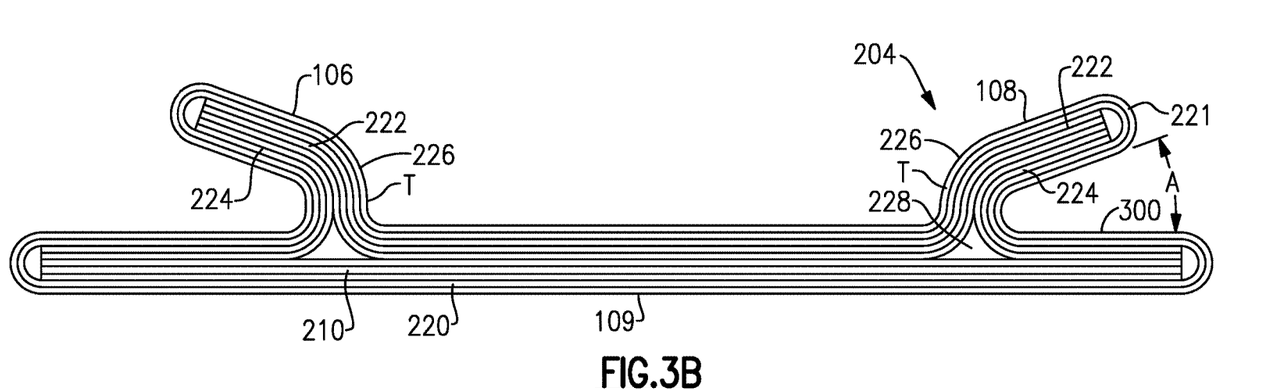
FIG. 3B shows an alternative blade outer air seal.

FIG. 3B shows a BOAS embodiment 204. As shown, there are central reinforcement laminates 210 and outer overwrap plies 220. There are hook reinforcement plies 222 extending across the web 109 and into each of the hook areas. There are also inner front end aft plies 224 forming radially inner portions of the hooks 106 and 108.

Each of structures 150/152/154/210/220/224 and 224 are shown to include plural layers or laminates.

The use of several laminates in the web 109 provides benefits. However, it is generally desirable to add additional material to make the laminates more stiff than their free woven fiber state. Thus, a process known as densification is utilized to increase the density of the laminate material after assembly. If too many laminates are formed in the central web, the radially more central laminates may not be adequately densified.

Figure 4A:
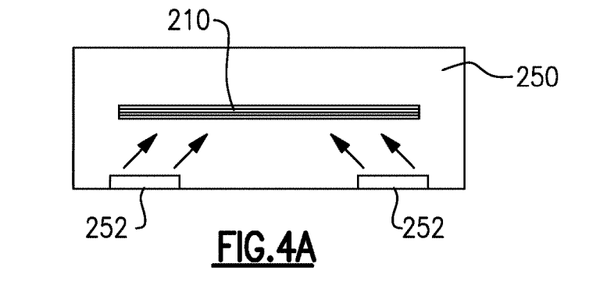
FIG. 4A shows a first method step to form a blade outer air seal.

Thus, in a method step as shown in FIG. 4A the reinforcement plies in member 210 may be initially stiffened in a densification chamber 250 as a separate densification process. Injectors 252 are schematically shown which inject materials such, as a silicon carbide matrix material, into spaces between the fibers in the woven layers. This may be utilized in the FIG. 4A step to provide 100% of the desired densification, or only some percentage. As an example, this initial step may be utilized to form between 10 and 90% of a desired densification.

One hundred percent densification may be defined as the layers being completely saturated with the matrix and about the fibers. One hundred percent densification may be defined as the theoretical upper limit of layers being completely saturated with the matrix and about the fibers, such that no additional material may be deposited. In practice, 100% may be difficult to achieve in practice.

Figure 4B:
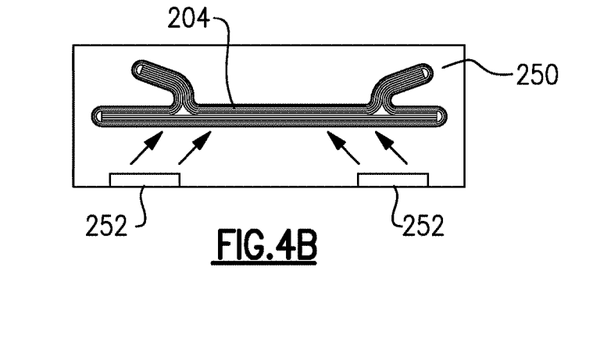
FIG. 4B shows a subsequent step to form a blade outer air seal.

As shown in FIG. 4B, the entire BOAS 204 is then formed with the additional layers, and having the overwrap plies 220 wrapping over the hook portions 222/224 and the reinforcement portion 210, and then additional densification occurs to all of these areas.

In another method, the FIG. 4A step could be eliminated, and the entire densification process occur in a single step. That is, rather than forcing member 210 as an intermediate product and then performing the FIG. 4B steps about this intermediate product 210, the entire BOAS can be formed at one time with the steps of FIG. 4B.

The same FIG. 4A/4B process may be useful for the FIG. 3A BOAS.

Returning to FIGS. 3A and 3B, spaces 158/156 and 228 between the laminates may be filled with loose fibers, no fibers, or other ceramic inserts, and in the densification process these will also be densified to harden.

In addition, it can be seen that the hooks 106 and 108 do not extend in a direction which is perpendicular to the vertical, or parallel to the axis of rotation Z (see FIG. 2). Rather, the angle A is at some intermediate angle between 20 and 70 degrees relative to an upper surface 300 of the BOAS, and radially inward of the hook.

In embodiments the angle A may be between 20 and 70 degrees. Outer surface 226 of hooks 106/108 is curved, not sharp cornered. This positioning facilitates the assembly of the BOAS, as will be explained below.

In embodiments the angle A may be between 20 and 70 degrees. Outer surface 226 of hooks 106/108 are curved, not sharp cornered. This positioning facilitates the assembly of the BOAS, as will be explained below.

Figure 5:
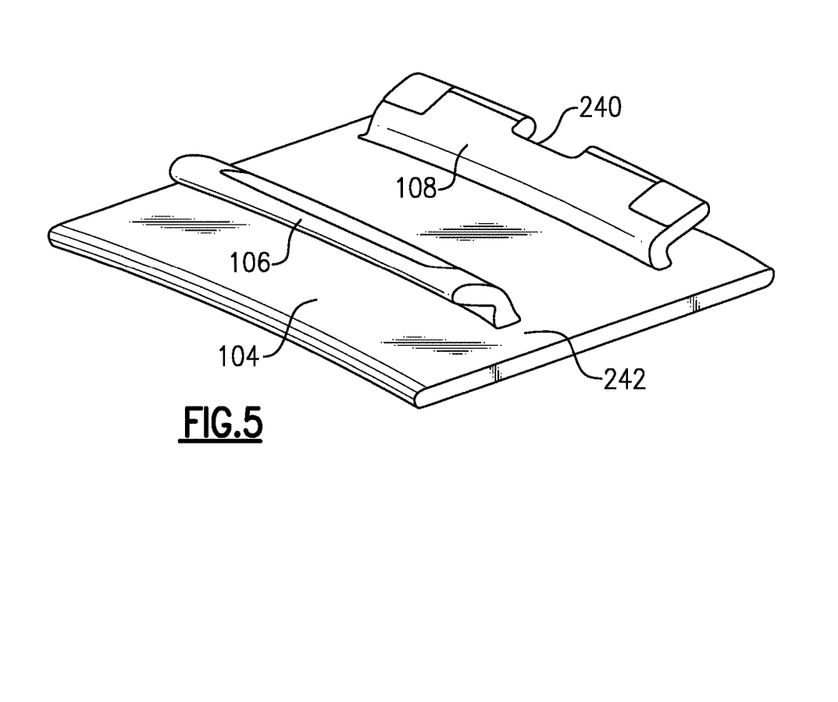
FIG. 5 shows another embodiment of a blade outer air seal.

FIG. 5 shows BOAS 104 having hooks 106 with 108 and a notch 240 that will catch on a tab on an attachment block to resist rotation.

Figure 6:
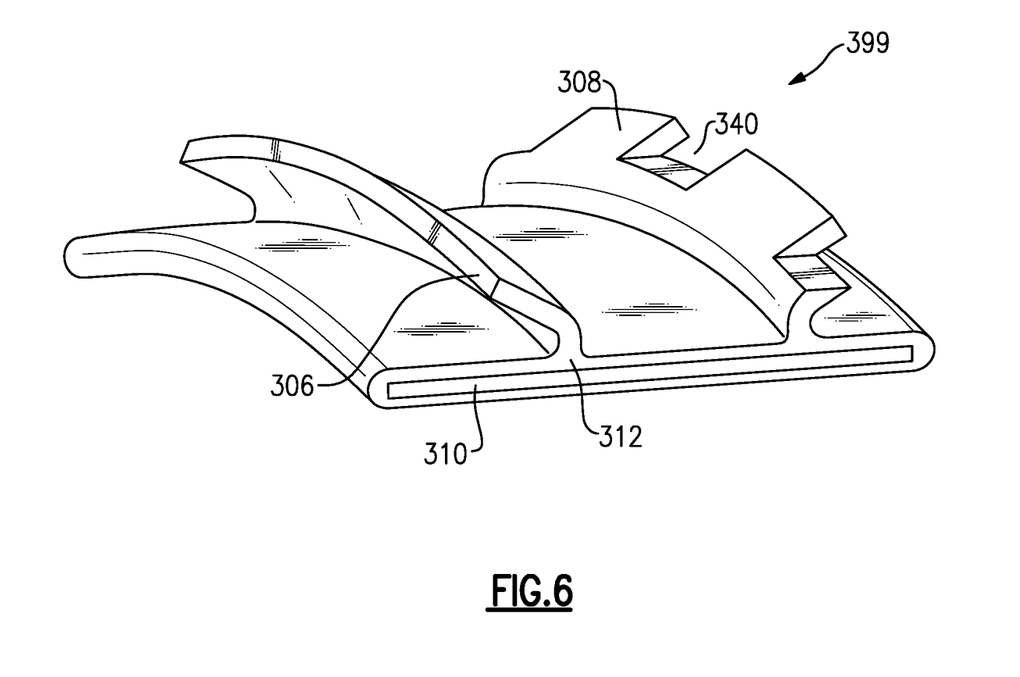
FIG. 6 shows an alternative embodiment blade outer air seal.

BOAS 99 as shown in FIG. 6 has its hooks 306 and 308 extending circumferentially to the edges 312. The reinforcement layer 310 is shown in this figure.

BOAS formed according to this disclosure provide beneficial operation due to the additional stiffness from the reinforcement layer. Options such as the pre-densification of FIG. 4A ensure that the central web will be of a desired rigidity, which might not occur if the inner layers were not adequately densified.

A method of forming a blade outer air seal could be said to include the steps providing an inner reinforcement member formed of a plurality of layers fibrous woven structure. A Ceramic Matrix material is injected into the fibrous woven structure and about fibers within the fibrous woven structure. Outer overwrap layers are wrapped around the inner reinforcement member. A densification matrix about fibers is injected in the fibrous woven overwrap structure.

The disclosure to this point is set forth in co-pending U.S. patent application Ser. No. 16/055,636, filed on Aug. 6, 2018 and entitled "Blade Outer Air Seal Reinforcement Laminate."

The hooks 106 and 108 are formed by a T-shaped joint, as shown in FIGS. 3A and 3B. While FIGS. 3A and 3B show the hooks 106 and 108 extending in a direction with both a lateral and radial component, the teachings to follow with regard to forming a T-shaped joint may also extend to hooks which extend generally radially outwardly, as has been proposed in recently filed patent applications by the assignee of the current application, U.S. patent application Ser. No. 16/108,335 filed on Aug. 22, 2018 and entitled "Blade Outer Air Seal Formed of Laminate and Having Radial Support Hooks."

Figure 7A:
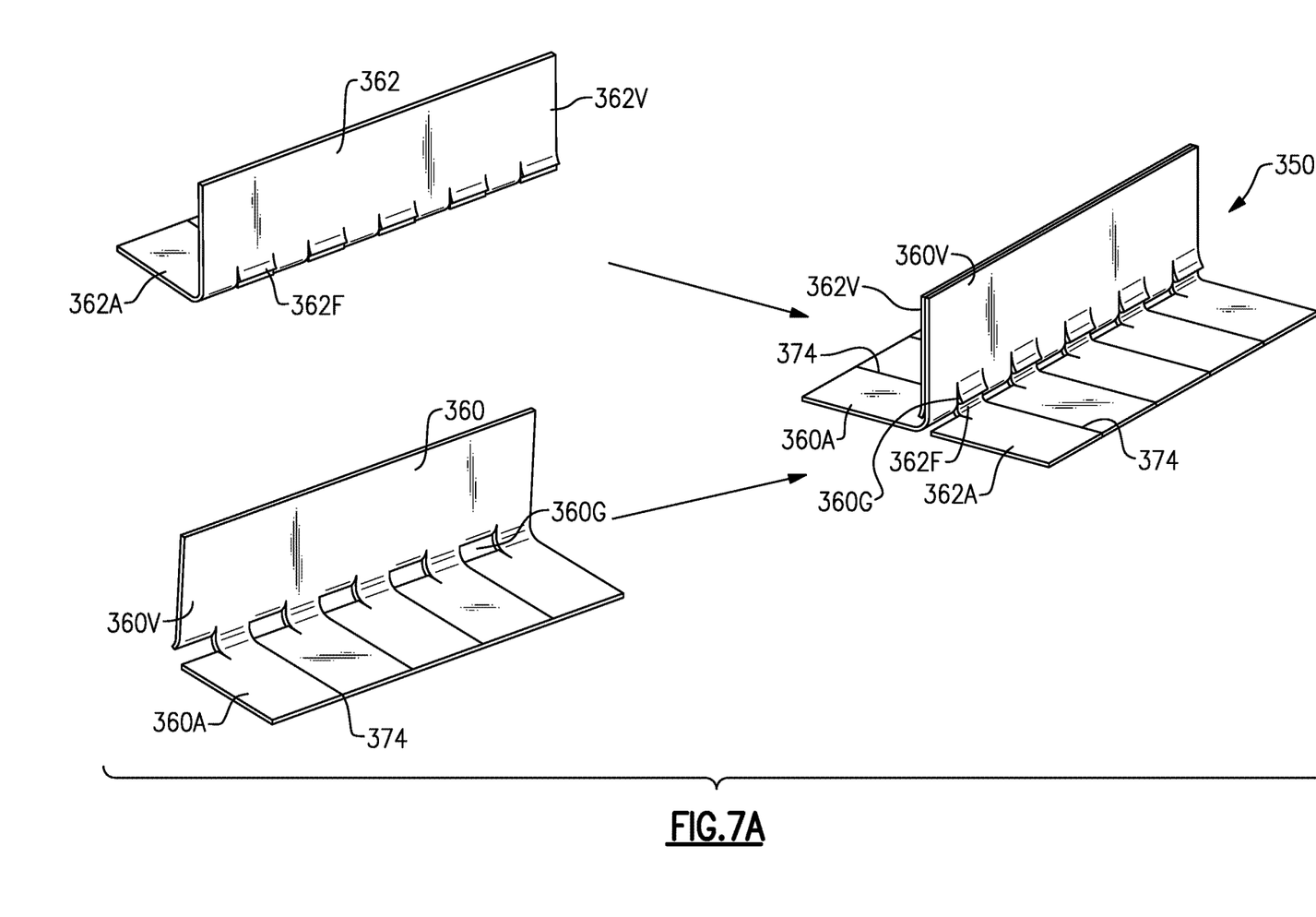
FIG. 7A shows assembly details of a T-joint within a blade outer air seal.

FIG. 7A shows an initial inner layer forming a T-shaped joint 350 wherein two inner plies are interwoven such that the joint is reinforced, and the loads will be better distributed among the several laminates as shown above. As shown in FIG. 7A, a laminate 360 could be said to include a vertical component 360V and an axial component 360A. A mating inner laminate could be said to include a portion 362V and an axial extending portion 362A. A finger 362F is shown extending through gaps, such as gaps 360G, in the laminate 360.

As shown in FIG. 7A, the two laminates 360 and 362 come together, such that fingers on one are interwoven within the gaps on the other. Also, slots 374 facilitate the movement of the two into the assembled position as shown in FIG. 7A from the two original components, as shown in FIG. 7A.

Figure 7B:
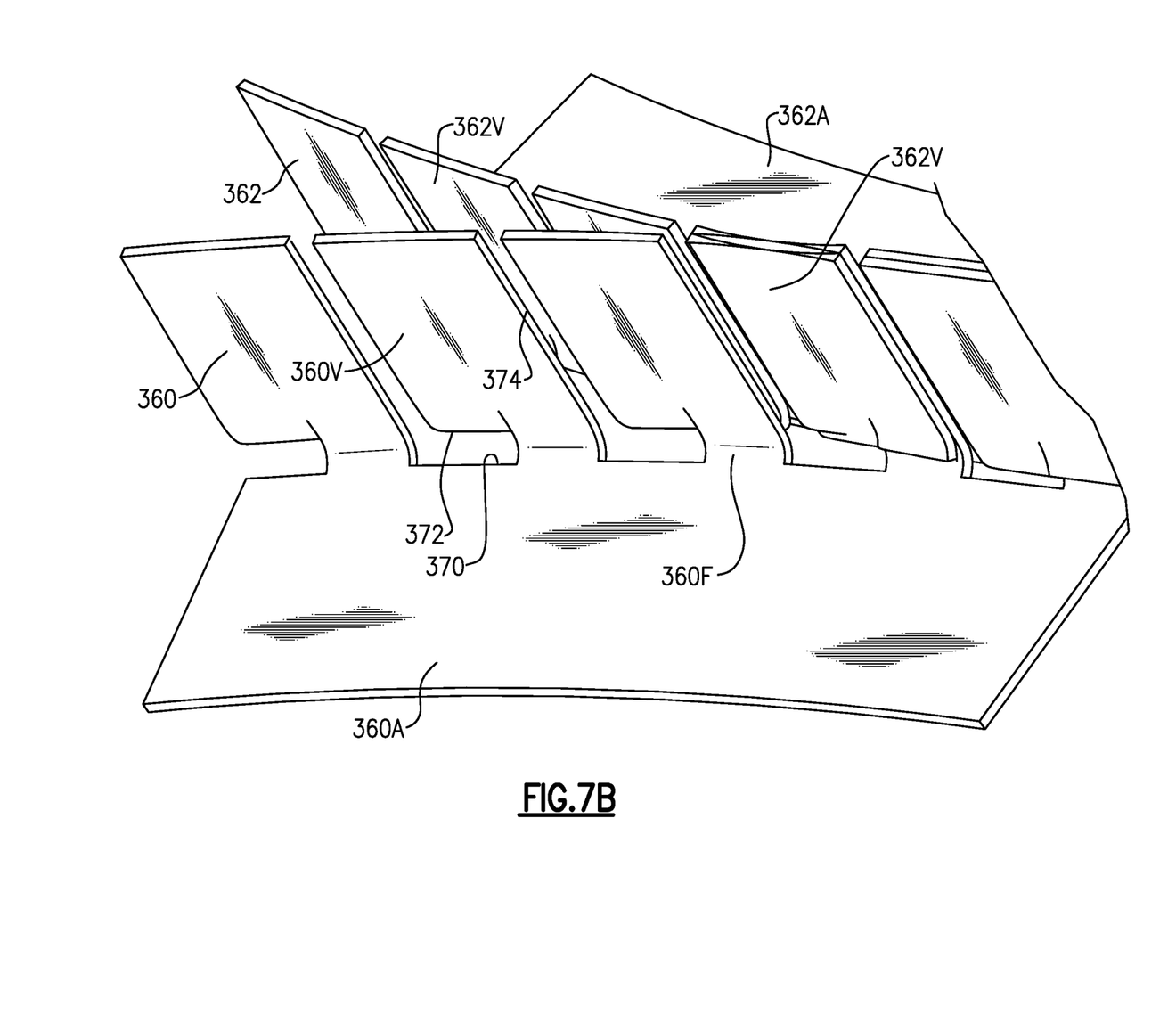
FIG. 7B shows a method step involved in the FIG. 7A assembly.

The interweaving of the piles may be done manually or with a weaving machine. One might envision the interconnection much like a zipper coming together and intermeshing. The laminates 360 and 362 could be on individual reels feeding a meshing mechanism. If ropes were utilized (see below) the ropes could also be intermeshed into the assembly as appropriate. FIG. 7B shows the interweaving, or interconnection, with the vertical portions 362V getting interwoven. That is, the interwoven portions could be the "vertical" or the "horizontal/axial" portions.

Figure 8A:
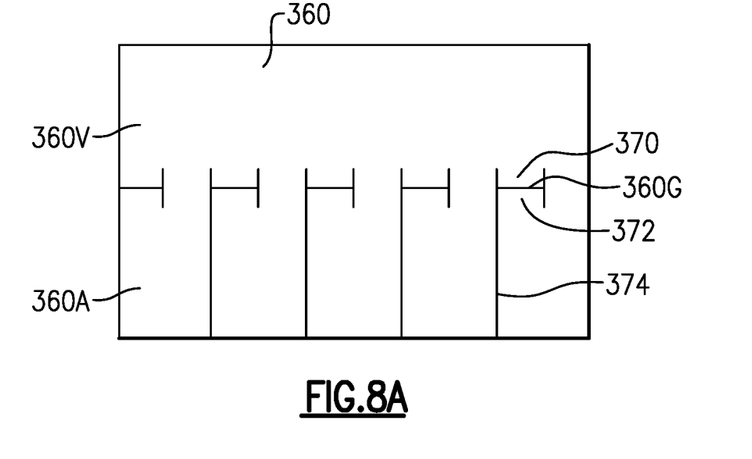
FIG. 8A shows a first step to form a T-joint.

FIG. 8A shows the cutting of the laminate 360 to have slots or gaps 360G, with tabs 370 and 372 and slots 374.

Figure 8B:
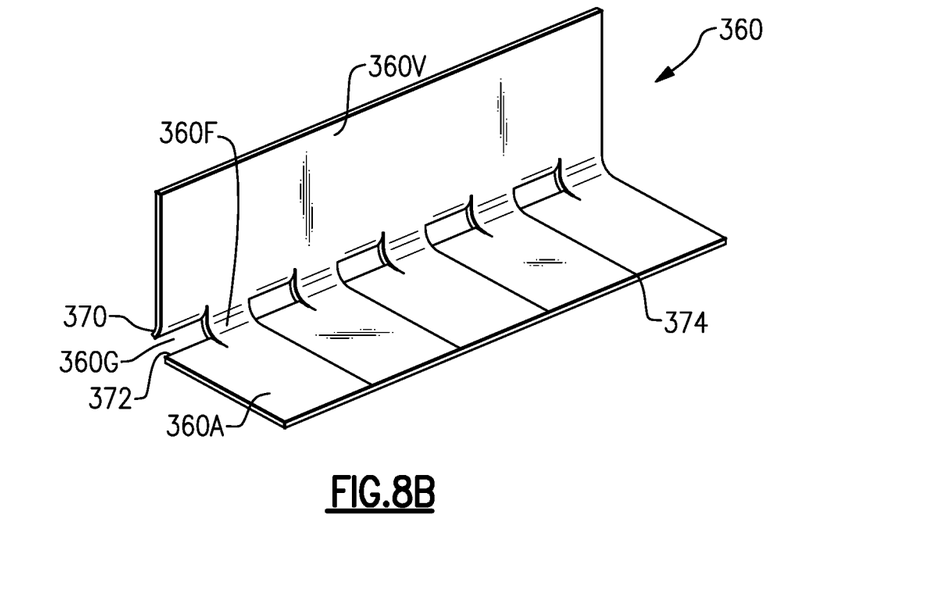
FIG. 8B shows a subsequent step to form a T-joint.

FIG. 8B shows the laminate bent such that sections 360V and 360A extend generally at a 90° angle.

Figure 8C:
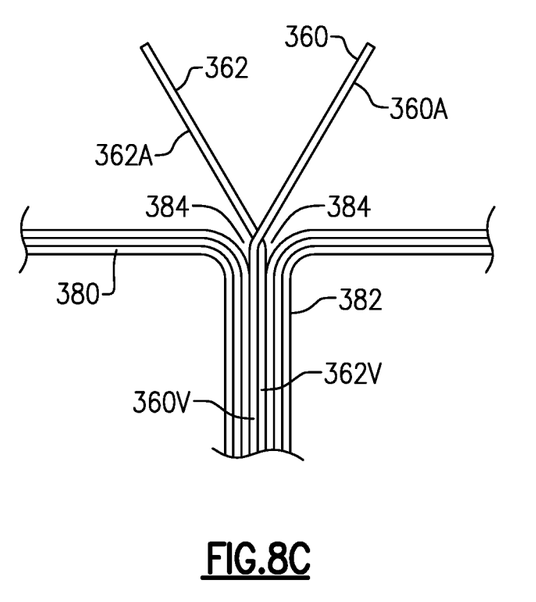
FIG. 8C shows yet another subsequent step to form a T-joint.

FIG. 8C shows the beginning of the creation of the overall BOAS T-joint. Laterally outer layers 380 and 382 are formed outwardly of the laminate 360 and 362. At this stage, the portions 360A and 362A may extend generally freely. However, the layers which form the hook are now being held together. It may be desirable to include some mechanism or device to hold any free tabs as they come together during this step. Manufacturing steps, as disclosed above with regard to FIGS. 4A and 4B, can take place repeatedly or in incremental points along this assembly process. As can also be seen, the laminates 360 and 362 have their vertical portion formed without cut outs or fingers, and the vertical portions sit in contact with each other radially outwardly of said fingers and gaps.

Figure 8D:
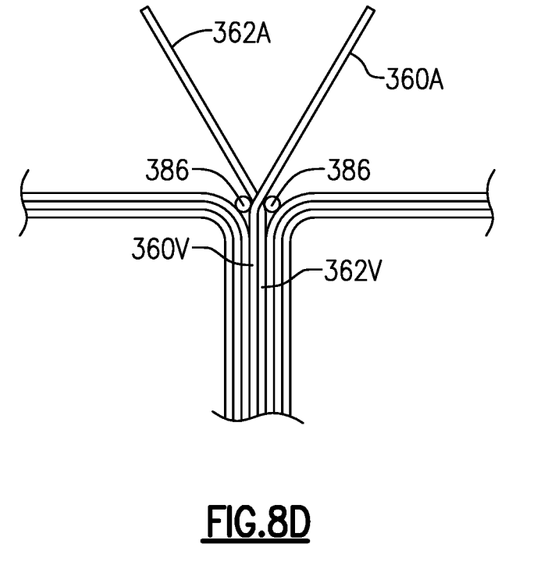
FIG. 8D shows yet another step to form a T-joint.

Ropes 386 may be added to the joint at the location where the axial and vertical portions 360A/V and 362A/V bend away, as shown in FIG. 8D. The ropes 382 here transfer forces across the T-joint. The ropes may be formed of material compatible with, or similar to the ceramic matrix composite materials of the laminates. The ropes would generally be sized to closely fill the holes, in at least one embodiment. The ropes could have various braid patterns and material characteristics depending upon the particular requirements or characteristics of the particular joint.

Figure 9A:
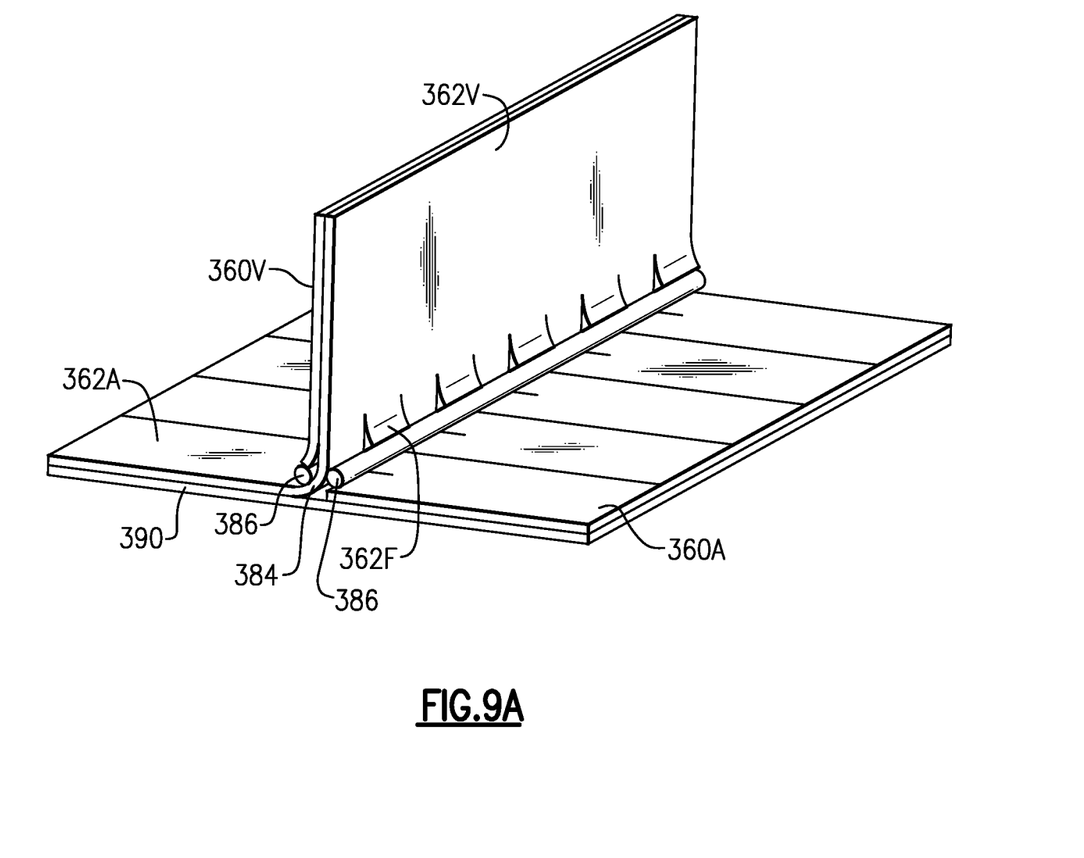
FIG. 9A shows an intermediate product after the FIG. 8D method step.

FIG. 9A shows an intermediate step, but without the layers 380 and 382 having been added. Those layers are omitted to better illustrate the details. As shown, a laterally outer layer 390 has been added outwardly of the area 384 that will form the base of the T-joint.

Figure 9B:
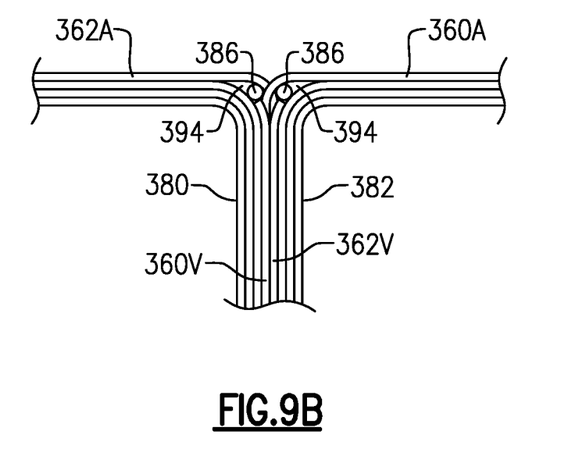
FIG. 9B shows a step subsequent to that of FIG. 8D to form a T-joint.

FIG. 9B shows assembly steps. Here, after placement of the ropes 386 in the spaces 394, the laterally or axially extending portions 362A and 360A are formed against portions 380 and 382. The assembly sequence, in one embodiment, would put laminations 380 and 382 into their respective mold halves and build up the laminations stacks until you get to laminations 362A and 360A along with ropes 394. When the interwoven subassembly is installed, mold halves can be closed to form the complete assembly. As mentioned below this T-joint would be used in many applications. The assembly sequence may differ given different applications. The assembly sequence might also vary depending on factors such as how automated the process is.

Figure 9C:
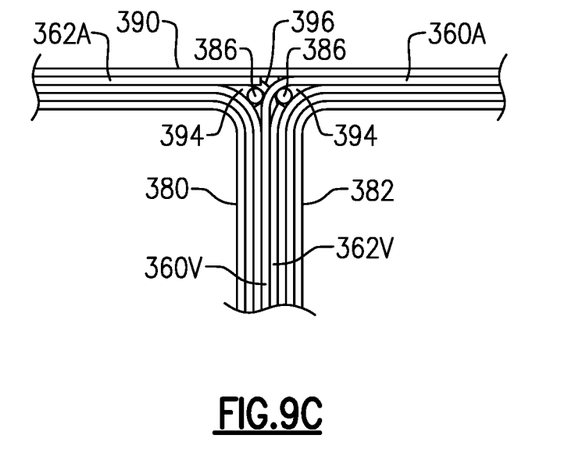
FIG. 9C shows yet another subsequent step to form a T-joint.

FIG. 9C then shows a subsequent step wherein fibers fill the gaps or spaces 394 and 396, as in the above-identified steps. Also outer laminate 390 is also attached.

The placement of the ropes transfers forces between the plies or laminates and further reduces the volume of the voids 394 and 396 which are filled with fibers.

The resulting T-shaped joint is stronger than be the case without the interweaving and placement of ropes. Moreover, it may result in a lighter part.

Figure 10:
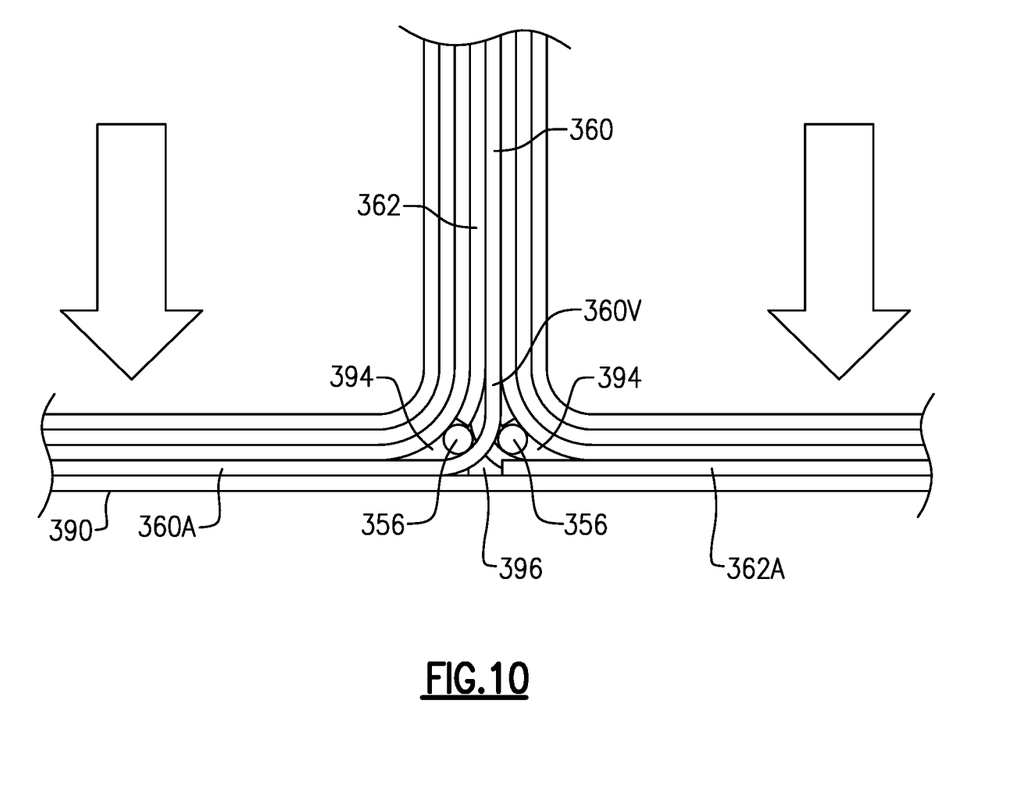
FIG. 10 is a cross-sectional view through a portion of a blade outer air seal.

FIG. 10 shows details of the cross-section and shows the interwoven nature of the layers 360 and 362. Again, one might envision the interconnection of the zipper here.

Although the term "vertical" is utilized for one portion forming the T-shaped joint and the term "axial" is utilized for the other portion, for purposes of this application and, in particular, its claims, it should be understood that these are more general directions rather than absolute directions. Thus, while the axial portion of say laminate 360 and 362 extends more axially than it does vertically, it may have a vertical component. The opposite is true for the vertical portion of the laminates 360 and 362. Also, while the directions may be absolute when mounted in an engine, they may simply be relative to each other in other applications. That is, the vertical an axial directions may be interpreted to simply mean perpendicular to each other with no absolute reference.

A gas turbine engine under this disclosure could be said to include a compressor section and a turbine section. The turbine section includes at least one rotor and at least one blade extending radially outwardly from the rotor to a radially outer tip. A blade outer air seal assembly is positioned radially outwardly of the radially outer tip of the blade. The blade outer air seal has forward and aft hooks. The forward and aft hooks support the blade outer air seal. The blade outer air seal is formed with a central web. The forward and aft hooks extend from the central web at T-joint. There is a pair of mating inner laminates. Each of the pair have an axially extending portion and a vertically extending portion. The pair of mating inner laminates have an interwoven connection. Spaces 394 are formed at both of two axial sides of the T-joint. Another space 396 is radially inward of the axially extending portions 360A and 362A of the pair of mating laminate. The spaces 394 and 396 contain fibers embedded in the silicon carbide matrix.

A method of forming a blade outer air seal could be said to include the steps of providing a pair of mating inner laminates each having an axially extending portion and a vertically extending portion and interweaving the mating inner laminates adjacent a location where the axially extending portions and the vertically extending portions merge. The method further includes the step of positioning outer laminate members each of the pair of mating inner laminates and on each of two axial sides of the vertical extending portions of the pair of mating laminates.

While the T-joint is illustrated as part of a BOAS, T-joints made according to the method and teachings of this disclosure may have benefits in any number of other locations. As an example, the CMC laminates could be utilized in gas turbine engine blades, vanes, combustor panels, and supporting structure. Any of these components, and any number of other components, including for applications outside gas turbine engines, could benefit from this disclosure. Also while CMC laminates are disclosed the tendency of this disclosure extend to laminates formed of other materials including organic matrix composites and polymer matrix composites.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a compressor section and a turbine section, said turbine section including at least one rotor and at least one blade extending radially outwardly from said rotor to a radially outer tip;
a blade outer air seal assembly positioned radially outwardly of said radially outer tip of said blade, said blade outer air seal having forward and aft hooks, and said forward and aft hooks supporting said blade outer air seal; and
said blade outer air seal formed with a central web, and said forward and aft hooks extending from said central web at T-joints, and there being a pair of mating inner laminates at each said T-joint, said mating inner laminates each having an axially extending portion and a vertically extending portion, and said pair of mating inner laminates having an interwoven connection; and
wherein said interwoven connection includes fingers on one of said pair of mating inner laminates sitting in gaps in the other of said pair of mating inner laminates.

2. The gas turbine engine as set forth in claim 1, wherein said pair of mating inner laminates are formed of a fibrous woven structure.

3. The gas turbine engine as set forth in claim 2, wherein said fibrous woven structure includes silicon carbide fibers, and a silicon carbide matrix received about said fibers and within said woven structure.

4. The gas turbine engine as set forth in claim 1, wherein there is a space at each said T-joint, and each of said spaces contain fibers embedded in silicon carbide matrix.

5. The gas turbine engine as set forth in claim 4, wherein ropes are positioned within each of said spaces, and contact at least one of said pair of mating laminates, and outer laminates are positioned outwardly of said ropes.

6. The gas turbine engine as set forth in claim 5, wherein said spaces are at both of two axial sides of each of said inner laminates and said spaces are radially inward of said axially extending portions of each of said pair of mating inner laminates.

7. The gas turbine engine as set forth in claim 6, wherein said ropes are in each of said spaces.

8. The gas turbine engine as set forth in claim 4, wherein said spaces are at both of two axial sides of each of said mating inner laminates and said spaces are radially inward of said axially extending portions of each of said pair of mating inner laminates.

9. The gas turbine engine as set forth in claim 1, wherein outer laminates are positioned at said T-joints outwardly of each axial side of said mating inner laminates, and said outer laminates not being formed with said fingers and said gaps.

10. A gas turbine engine comprising:
a compressor section and a turbine section, said turbine section including at least one rotor and at least one blade extending radially outwardly from said rotor to a radially outer tip;
a component formed of matrix composites and formed with a central web, and at least one portion extending from said central web at a T-joint, and there being a pair of mating inner laminates, said pair of mating inner laminates having an interwoven connection; and
wherein said interwoven connection includes fingers on one of said pair of mating inner laminates sitting in gaps in the other of said pair of mating inner laminates at the T-joint each having an axially extending portion and a vertically extending portion.

11. The gas turbine engine as set forth in claim 10, wherein outer laminates are positioned at said T-joint outwardly of each axial side of said mating inner laminates, and said outer laminates not being formed with said fingers and said gaps.

12. The gas turbine engine as set forth in claim 1, wherein each of said mating inner laminates have an outer vertical extending portion formed without said fingers and said gaps, and extending radially away from said fingers and gaps, and said outer vertically extending portions of each of said mating inner laminates being in contact with each other and forming a portion of said forward and aft hooks.

* * * * *